Figure 1:
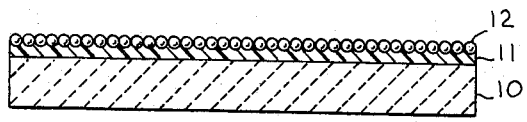

Oct. 10, 1967     H. L. KIDDER ET AL     3,346,674

METHOD FOR FABRICATING BACKLIT PROJECTION SCREENS

Filed Dec. 4, 1962

POUL B. ROULUND
HARVEY L. KIDDER
          INVENTORS

BY *Allen E. Botney*

ATTORNEY

3,346,674
METHOD FOR FABRICATING BACKLIT PROJECTION SCREENS

Harvey L. Kidder, San Pedro, and Poul B. Roulund, Redondo Beach, Calif., assignors to FMA, Inc., El Segundo, Calif., a corporation of California
Filed Dec. 4, 1962, Ser. No. 242,193
2 Claims. (Cl. 264—1)

The present invention relates in general to improvements in viewing screens and more particularly relates to a new method for making a backlit projection screen.

Screens of the present invention may be used in any viewing system in which an image is projected on one side of a screen and viewed from the opposite side. In using projection screens of the kind mentioned, it will at once be recognized that it is desirable that the projected light be scattered as much as possible in a forward direction only, that is to say, toward the viewer, since, by substantially eliminating back scattering of the light, the micro contrast of the image is very greatly improved, which means that a much sharper image is produced.

It is, therefore, an object of the present invention to provide a method for the manufacture of a backlit projection screen that substantially eliminates internal reflections.

It is another object of the present invention to provide a process for the manufacture of a backlit projection screen having properties such that the micro contrast of pictures presented on it are greatly improved.

The scattering in a forward direction only of light projected onto the screen from the rear is achieved by means of a layer of tiny randomly distributed hemispherical lenses on one face of the screen. The surface of the screen having these minute lenticular or protuberances thereon is the projection surface, the picture or light image being projected onto the viewing surface through the screen from the rear. The essence of the invention lies in the dual discovery that the referred-to layer of hemispherical lenses may be formed with tiny spherical beads or balls made of a transparent material, such as glass, and that these beads may merely be brushed onto the surface of the screen material after the latter has been initially treated to receive the beads.

The novel features which are believed to be characteristic of the invention, together with further objects and advantages thereof, will be better understood from the following description considered in connection with the accompanying drawing in which methods and the apparatus therefor are illustrated by way of example. It is to be expressly understood, however, that the drawing is for the purpose of illustration and description only and is not intended as a definition of the limits of the invention.

FIGURE 1 is a representation of a backlit projection screen produced in accordance with a basic method of the present invention; and FIGURES 2a–2d illustrate the step involved in a more sophisticated technique for producing a backlit projection screen in accordance with the present invention.

Referring now to the drawings and in particular to FIG. 1 therein, a transparent screen base material 10, such as plexiglass or plain glass, is dipped into a bath of a transparent adhesive substance, such as, for example, the substance known by its trade name of LTV–602, manufactured by the Silicone Products Department of the General Electric Corporation, Waterford, N.Y. LTV–602 is one of a series of low temperature curing compounds that cures with the addition of a catalyst to form a completely transparent, resilient solid. Having dipped base material 10 into the LTV–602 bath, the excess of this LTV substance is permitted to run off until a very thin, even coat 11 of it remains on the surface of the base. The abovesaid coated structure is then partially cured, either at room temperature for about two hours or in an oven maintained at 150° F. for approximately twenty minutes, until the LTV coating is in a tacky state.

At this time and with the aid of an ordinary paint brush, tiny glass beads or ball, which may be either hollow or solid, are brushed onto the surface of LTV coating 11 and, because of its tacky state, the beads will become half immersed in it, that is to say, the beads will sink into the coating to a depth substantially equal to their radii. With sufficient brushing, a layer of beads 12 is formed on and completely covers the surface of the coating. With respect to the tiny glass beads or balls mentioned, the beads may be purchased with diameters down to a micron but the diameter of the beads actually used depends upon the resolution desired for the projection screen fabricated, the resolution being inversely proportional to the size of the beads. Thus, for example, to obtain an extremely high resolution screen, for example a resolution of 160 lines per millimeter, beads of about six to eight microns in diameter would be used. As stated earlier, the beads may be solid or hollow, the solid beads being somewhat easier to handle. Beads of the type mentioned are commercially available in sizes that range from a diameter of approximately one micron to a fraction of an inch, the solid beads being manufactured and sold by Microbeads Inc., of Jackson, Miss., and the hollow beads being manufactured and sold by Emerson & Cuming, Inc., 869 Washington St., Canton, Mass.

Once the beads have been brushed onto the thin LTV–602 coating, thereby forming a layer of them, the completeness with which the job has been done may be checked visually by projecting light onto bead layer 12 and simultaneously looking through the combination toward the light source from the bottom side of base 10. If the beads have been properly packed together so that a high enough and uniform enough bead density has been attained, then the light source will not be visible by the viewer. On the other hand, if the packing or bead density is not adequate, or if the screen is non-uniform in its various layers, then tell-tale marks will be observed during the course of this visual test, such as streaks, brush marks, and ripples if the LTV–602 coating is not on evenly. Assuming that a good screen structure has been fabricated thus far, the final step is that of properly curing the screen combination comprising elements 10, 11 and 12. In curing this combination, it may be left overnight at room temperature or it may be placed in an oven maintained at 150° F. for slightly more than one half hour. As a result of this final step of curing, layer 11 becomes quite hard, thereby firmly or rigidly holding in place beads 12 that are half-embedded in it.

It is thus seen that by means of the method described, we have a screen with a layer of tiny half-embedded spheres on its surface which act as small lenses that scatter light in a forward direction only, thus eliminating unwanted back scattering, reducing internal reflections, and improving the micro contrast.

It should also be mentioned at this point that the LTV–602 coating can be applied to the screen base in ways other than by dipping. Thus, equally good results can be obtained by painting the coating on with a brush, by spraying it on, etc. It should additionally be stated that LTV–602 is only one of a number of substances that can be used to provide a suitable coating. Thus, clear plastics are available as substitutes for LTV–602.

The method delineated in connection with FIG. 1 may be modified by using a base that already has an adhesive coating on one side of it that is pressure sensitive. Hence, instead of going through the steps of coating base 10 with a material 11 and then curing the same, a satisfactory rear projection screen may be obtained by brushing a layer of beads onto the adhesive surface of the adhesive-coated base. Adhesive-coated bases of the type mentioned and that may be used herein are presented and discussed in detail in Chaper 51 of the book entitled "Handbook of Adhesives" by Irving Skeist, publshed in 1962 by the Reinhold Publishing Corporation, New York. Chapter 51, which was written by C. W. Bemmels, entitled "Adhesive Tapes," is found on page 586 of the above-entitled book.

The FIG. 1 method is basic to still other techniques that may be utilized in the manufacture of backlit projection screens. Accordingly, reference is now made to FIG. 2a wherein a layer of LTV–602 material 11 is shown at the bottom of a suitably-shaped vessel or container 13. More specifically, LTV–602, which is normally in liquid form, is poured into the bottom of vessel 13, the LTV–602 thereafter being cured as before until it is in a tacky state. At this point, beads 12 are brushed onto the surface of layer 11 until an adequate layer of these beads is achieved in accordance with the requirements previously specified. Following the formation of layer 12, vessel 13 and its contents are cured in the manner heretofore detailed, that is to say, either overnight at room temperature or in an oven maintained at a temperature of 150° F. for about thirty minutes. This causes the layer of LTV–602 to harden and firmly hold the beads in place.

In the next step, a flexible mold material 14 in liquid form is poured over the layer of beads 12, the mold material then being allowed to harden by means of the curing process, either at room temperature or in an oven. One desirable mold material is a silicone rubber compound known as RTV–60 which is produced and sold by General Electric, Silicone Products Department, Waterford, N.Y. RTV–60 cures to a strong, durable, resilient silicone rubber and molds made of this material easily release plastics, even epoxies, without a release agent. RTV–60 is also a desirable material because its low shrinkage insures accurate reproductions. However, RTV–60 has shown a tendency to stick to the layer of LTV–602 material beneath it, the RTV–60 entering the small spaces left between the beads, thereby occasionally producing undesirable non-uniform screen surfaces. Accordingly, various other materials can be used instead of RTV–60 as a mold material since the physical properties required for a material are (1) that it have the ability to take a cast and release from the LTV–602 layer and bead layer beneath it; (2) toughness to resist physical stress, such as abrasion, pulling, bending, etc., and environmental conditions, such as heat, light, etc., and (3) the ability to have an epoxy cast or other clear plastic cast taken of its surface and release from these substances. Examples of materials other than RTV–60 that may be used are vinyl plastisol, polypropylene, the material known as Epolene manufactured and sold by Eastman Kodak, Rochester, N.Y., and the like.

Figure 2:
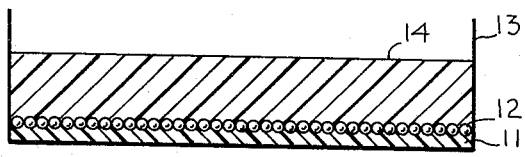
Figure 2:
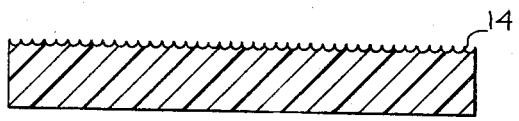
Figure 2:
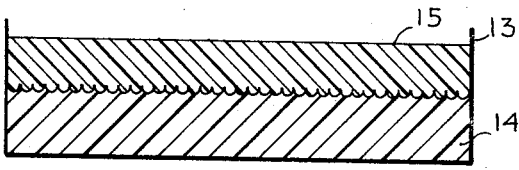
Figure 2:
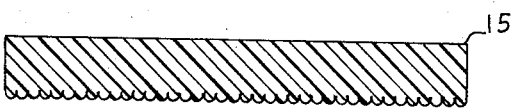

Once the mold material has hardened, it is removed from bead layer 12 and this can be done simply by pulling layer 14 off of it. The removed mold is shown in FIG. 2b and, as shown, the surface of the mold material that was in contact with the layer of beads is completely covered with randomly distributed hemispherical recesses. To fabricate a backlit projection screen of the kind herein involved, mold 14 is returned to container 13 as shown in FIG. 2c. The surface containing the above-said hemispherical recesses is then completely covered with a clear epoxy or other clear plastic material, such as methyl methacrylate. After a while, the epoxy or other plastic material will harden to form layer 15. When it does, it is stripped off master mold 14 to provide the desired backlit projection screen, as is shown in FIG. 2d. It will be noticed that one surface of the screen is completely covered with randomly distributed hemispherical protuberances, this being the surface that was in intimate contact with the surface of mold 14 containing the hemispherical recesses. These hemispherical protuberances act as lenses and have the effect of projecting the light forward.

The method delinated above in connection with FIGS. 2a–2d may be modified by using an adhesive-coated base as before as a substitute for the LTV–602 layer 11. Thus, as previously described, bead layer 12 is formed on the adhesive surface of an adhesive-coated base, master mold 14 then being made in the same manner, namely, by pouring RTV–60 over the layer of beads and then curing it until it hardens. After it has hardened, the mold is pulled free of the bead layer and is thereafter used in the same manner as heretofore set forth to fabricate projection screens in accordance with the present invention.

Although particular methods have been illustrated and described above by way of example, it is not intended that the invention be limited thereto. Accordingly, the invention should be considered to include any and all modifications, alterations or equivalent steps falling within the scope of the annexed claims.

Having thus described the invention, what is claimed is:

1. A method of fabricating a projection screen having a surface covered with a layer of tiny randomly distributed hemispherical lenses, said method comprising the steps of: placing a first fluid substance that will harden into a resilient solid into a container of suitable configuration; curing said first substance until its consistency is tacky; forming a half-immersed layer of tiny spheres on the surface of said cured substance; further curing said first substance until it hardens into a first resilient solid; placing a second fluid substance that will harden into a resilient solid over said layer of spheres; curing said second substance until it hardens into a second resilient solid; separating said second resilient solid from said layer of spheres, thereby producing a mold whose surface is covered with hemispherical recesses; and molding the projection screen from said mold.

2. A method of fabricating a mold from which can be made a projection screen having a surface covered with a layer of tiny randomly arranged hemispherical lenses, said method comprising the steps of: pouring a liquid substance that will harden into a resilient solid into a container of suitable configuration; curing said substance until it becomes sufficiently tacky to permit tiny beads to sink into its surface until they are half-immersed in it; brushing a layer of tiny beads onto the surface of said tacky substance, the beads sinking until they are half-immersed in it; curing the container and its contents until it hardens to firmly hold the beads in place; pouring a flexible mold material in liquid form into the container and over the layer of beads; again, curing the container and its contents until the mold material hardens into a flexible solid; separating the hardened mold material from the layer of spheres beneath it to obtain a mold having a surface entirely covered with randomly arranged hemispherical recesses.

References Cited

UNITED STATES PATENTS

| | | | |
|---|---|---|---|
| 2,248,638 | 7/1941 | Merton | 264—225 |
| 2,248,811 | 7/1941 | Cotterman | 264—227 |
| 2,378,252 | 6/1945 | Staehle et al. | 117—33 |
| 2,498,489 | 2/1950 | Haggart | 88—82 |
| 2,936,814 | 5/1960 | Yakubik | 264—277 |
| 3,164,645 | 1/1965 | De Vries et al. | 264—1 |

ALEXANDER H. BRODMERKEL, *Primary Examiner.*

J. R. DUNCAN, B. SNYDER, A. H. KOECKERT,
*Assistant Examiners.*